(12) United States Patent
Vogel

(10) Patent No.: US 8,246,173 B2
(45) Date of Patent: Aug. 21, 2012

(54) IMAGE ADJUSTMENT DEVICE AND METHOD FOR AN IMAGE PROJECTOR IN AN AIRCRAFT

(75) Inventor: Carsten Vogel, Hamburg (DE)

(73) Assignee: Airbus Operations GmbH (DE)

( * ) Notice: Subject to any disclaimer, the term of this patent is extended or adjusted under 35 U.S.C. 154(b) by 265 days.

(21) Appl. No.: 12/664,499

(22) PCT Filed: Jun. 5, 2008

(86) PCT No.: PCT/EP2008/057030
§ 371 (c)(1),
(2), (4) Date: Dec. 14, 2009

(87) PCT Pub. No.: WO2008/151982
PCT Pub. Date: Dec. 18, 2008

(65) Prior Publication Data
US 2010/0188589 A1     Jul. 29, 2010

Related U.S. Application Data

(60) Provisional application No. 60/934,631, filed on Jun. 14, 2007.

(30) Foreign Application Priority Data

Jun. 14, 2007   (DE) .......................... 10 2007 027 421

(51) Int. Cl.
*G03B 21/14* (2006.01)
(52) U.S. Cl. ................ 353/69; 353/12; 353/13; 353/15; 353/30; 353/31; 353/32; 353/70; 353/71; 353/79; 353/98; 353/119; 353/122

(58) Field of Classification Search ............... 353/12, 353/13, 15, 30, 31, 32, 69, 70, 71, 79, 98, 353/99, 119, 122; 701/3, 4, 11–17, 23, 33, 701/36, 200, 207, 211, 120; 348/177, 178, 348/187–189, 745, 806, 61, 135, 362–365; 349/5–9
See application file for complete search history.

(56) References Cited

U.S. PATENT DOCUMENTS

| | | | | |
|---|---|---|---|---|
| 5,658,063 | A | * | 8/1997 | Nasserbakht ................. 353/122 |
| 6,520,646 | B2 | * | 2/2003 | Rodriguez et al. .............. 353/69 |

(Continued)

FOREIGN PATENT DOCUMENTS

DE            20211819 U1    12/2003

(Continued)

OTHER PUBLICATIONS

Oliver Bimber et. al., Embedded Entertainment with Smart Projectors ; IEEE Computer Society, pp. 48-52, Jan. 2005.

(Continued)

*Primary Examiner* — Georgia Y Epps
*Assistant Examiner* — Sultan Chowdhury
(74) *Attorney, Agent, or Firm* — Lerner, David, Littenberg, Krumholz & Mentlik, LLP

(57) ABSTRACT

An image adjusting device and method for image projection in an aircraft, in which vibration-induced excursions between a projection device and an associated projection surface are offset via the corresponding acquisition of position-time states in such a way that an image displayed on a display surface remains essentially unchanged.

18 Claims, 4 Drawing Sheets

U.S. PATENT DOCUMENTS

| | | | |
|---|---|---|---|
| 7,158,151 B2 * | 1/2007 | Asami | 345/629 |
| 7,167,645 B2 * | 1/2007 | Matsuda et al. | 396/213 |
| 7,280,896 B2 * | 10/2007 | Morizet et al. | 701/3 |
| 7,419,268 B2 * | 9/2008 | Kobayashi | 353/69 |
| 7,643,063 B2 * | 1/2010 | Trescott | 348/208.5 |
| 7,717,569 B2 * | 5/2010 | Sokeila et al. | 353/69 |
| 7,753,531 B2 * | 7/2010 | Fujita et al. | 353/50 |
| 2004/0264918 A1 * | 12/2004 | Turner et al. | 386/46 |
| 2006/0082736 A1 | 4/2006 | Grueger | |
| 2008/0122996 A1 * | 5/2008 | Mochizuki | 349/5 |

FOREIGN PATENT DOCUMENTS

| | | |
|---|---|---|
| DE | 102004051607 A1 | 3/2006 |
| DE | 102004050351 B3 | 6/2006 |
| JP | 2003149729 A | 5/2003 |

OTHER PUBLICATIONS

VIOSO, Smartprojecting Expert; Projection on any surfaces. Samrtprojecting expert for the professional AV-specialist, Apr. 2007.

* cited by examiner

IMAGE ADJUSTMENT DEVICE AND METHOD FOR AN IMAGE PROJECTOR IN AN AIRCRAFT

CROSS-REFERENCE TO RELATED APPLICATIONS

This application is a national phase entry under 35 U.S.C. §371of International Application No. PCT/EP2008/057030, filed Jun. 5, 2008, published in English, which claims the benefit of the filing date of United States Provisional Patent Application No. 60/934,631 filed Jun. 14, 2007 and of German Patent Application No. 10 2007 027 421.3 filed Jun. 14, 2007, the disclosures of which applications are hereby incorporated herein by reference.

FIELD OF THE INVENTION

The present invention relates to an image adjustment device for an image projection device, an image projection device and an image adjustment method for adjusting an image during image projection in an aircraft.

BACKGROUND OF THE INVENTION

Image or film projection are increasingly being used in aircraft, but also in ships and trains, for both entertaining and informing passengers. On the one hand, reasons of efficiency dictate that this type of projection system should be adjusted to the size of the projection surface in such a way as to use as much of the entire projection surface as possible. On the other hand, motor vehicles, in particular aircraft, experience strong vibrations that might result in unsatisfactory projection results in an image or film projector.

Geometries are normally adjusted by using computer technology to process the image or film material itself, i.e., before actual projection, and then relay it to a projection unit. However, commercially available projectors only enable a limited adjustment to the projection surface, e.g., through lens shifting or trapezoidal correction. But this type of adjustment is generally relatively inflexible.

Furthermore, as a rule, commercially available projectors do not make it possible to counter vibration influences.

SUMMARY OF THE INVENTION

The present invention provides an image adjustment device or image adjustment method for image projection, in particular in an aircraft, which makes it possible to calibrate images or film projected on a projection area, and stabilize them relative to vibration influences.

It should be understood that the embodiments of the invention described below relate to the image adjustment device, the image projection device, the method and a corresponding computer program, as well as a computer-readable medium and corresponding aircraft.

In an exemplary embodiment of the invention, an image adjustment device for an image projection device for an aircraft is provided with a first input for image information for an image to be displayed on a display surface, and a second input for image adjustment information and a control device designed to control an image display device based on the image information present at the first input and the image adjustment information present at the second input.

In this way, existing image information for an image to be displayed and image adjustment information can be used as the basis for adjusting the image display, for example to achieve a desired projection position or projection size on a projection surface, or to offset vibration influences, which can arise between the projection surface or a display surface of an image to be displayed and an image display device, e.g., in the form of a projector. In other words, given a relative shift of a projection source and accompanying projection surface, for example, the device according to the invention can be used to offset this shift by correspondingly controlling the projection device, so that a display on a projection surface remains essentially unchanged despite a relative shift in the projection device.

It should be noted that it is not mandatory for the image adjustment device to encompass a display surface and an image display device.

In an exemplary embodiment of the invention, the second input is designed to acquire information about a desired position of an image to be displayed on a display surface.

This makes it possible to set the projection position or projection size of an image to be displayed, for example. Position here implies not just a shift, for example in a horizontal or vertical direction, but also an expansion, compression or other type of image distortion.

Further provided in an exemplary embodiment of the invention is an input device designed to manually input the image adjustment information.

In this way, the projection size or projection position can be manually set via keyboard entry or a presetting, thereby enabling optimal use of the projection surface.

In an exemplary embodiment of the invention, the image adjustment device further consists of a position-time state acquisition device, which is designed to acquire position-time state information for an image display device with respect to a display surface for an image to be displayed, and an evaluation device, which is designed to evaluate the position-time state information, so as to provide the image adjustment information based on the evaluated position-time state information.

This makes it possible to use external sensors, for example, to acquire the position-time state information of an image display device and a display surface for an image to be displayed, evaluate it and to convert this information into image adjustment information, for example. Position-time state information is herein understood as any information that encompasses data about a relative position and time state of the image display device, for example in the form of a projection device, and a display surface, for example a projection surface.

In an exemplary embodiment of the invention, the position-time state acquisition device is designed to acquire information about a position, a movement and/or an acceleration of an image display device relative to a display surface of an image to be displayed in the image plane.

For example, corresponding sensors scan be used to determine the relative position of the image display device, for example a projector, and a display surface, for example a projection surface, relative to each other, but also the movement or acceleration relative to each other. The respective type of information depends on the sensor used. In this case, acquiring the position, movement or acceleration in one direction in the image plane is of special interest, since in particular these directions of movement have a significant influence on the projection result. However, a position-time state that is completely or partially perpendicular to the image plane can be ascertained and used for correcting the sharpness setting, if needed. To this end, a corresponding control operation can be performed.

In an exemplary embodiment of the invention, the control unit is configured in such a way as to actuate an image display device in such a way given a change in the position-time state information as to leave a display of the image to be displayed on the display surface essentially unchanged.

In this way, the viewer perceives an unchanged image display on the projection surface even given a major change in the position-time state between a projection device and a projection surface, for example, during strong vibrations. This can be accomplished by way of a control operation that offsets the vibration effect, for example the image-generating elements in a projector.

In an exemplary embodiment of the invention, the control device is configured in such a way that, given a change in the position state information, pixels of a pixel panel acting as an image display device can be controlled by changing the position-time state information in such a way that the display of an image to be displayed on a display surface remains essentially unchanged.

When using a pixel panel, this can be accomplished, for example, via the correspondingly rapid, shifted control of adjacent pixels with the corresponding image information, thereby compensating for a vibration, i.e., a relative shift in the projection device relative to the projection surface, by a correspondingly shifted, compensating control of the corresponding pixels on a pixel panel, in such a way that the display on the projection surface remains essentially unchanged.

One exemplary embodiment of the invention provides an image projection device for an aircraft, with an image adjustment device according to the invention and an image display device.

In this way, for example, an image can be adjusted within a projector, wherein the projector in this case represents the image projection device, the corresponding image adjustment device introduces an adjustment or adjusted control operation, and this adjusted image is displayed by an image display device, for example, the actual optical image-generating element.

It should be understood that not just static images can be involved here, but also moving images, meaning films of the like. In this case, it may become necessary to synchronize the adjustment with the display refresh.

In an exemplary embodiment of the invention, the image display device exhibits a pixel panel.

As already described above, this makes it possible to counter a position charge, a movement or acceleration by changing pixel control, so that an image or film can be displayed on a projection surface essentially unchanged. The use of a pixel panel may essentially eliminate the need for moving parts, since only one control operation shifted on a pixel matrix can be performed to counter a corresponding vibration, for example.

In an exemplary embodiment of the invention, an image adjustment method for an image adjustment device encompasses an acquisition of image information for an image to be displayed on a display surface, an acquisition of image adjustment information and a control of an image adjustment device based upon the image information and image adjustment information.

In this way, image information and corresponding image adjustment information can be used as the basis for adjusting image display by correspondingly controlling an image display device, for example a projector, so as to in this way either calibrate a position or projection size on a projection surface, or counter a vibration by way of a compensating projection, for example.

In an exemplary embodiment of the invention, the image adjustment information encompasses information about a desired position of the image to be displayed on a display surface.

In an exemplary embodiment of the invention, the image adjustment method further encompasses a manual input of image adjustment information.

This can be provided to precalibrate a projection arrangement, for example.

In an exemplary embodiment of the invention, the image adjustment method further encompasses an acquisition of position-time status information for an image display device relative to a display surface for an image to be displayed, an evaluation of position-time state information, and a provision of image adjustment information based on the evaluated position-time state information.

For example, this makes it possible to determine the position-time state of a projection arrangement, in particular a projector and an associated projection surface. A position-time state can be a position, a movement, or an acceleration or a combination thereof, e.g., a vibration of the arrangement, depending on sensors used that acquire such position-time state information.

In an exemplary embodiment of the invention, the position-time state information encompasses information about the position, movement and/or acceleration of an image display device relative to a display surface of an image to be displayed in the image plane.

This makes it possible to offset the shift perceived on a greater scale by a viewer in particular in the image plane, and implement a projection compensated in this regard.

In an exemplary embodiment of the invention, the control operation is performed in such a way that, given a change in the position-time state information, a display of an image to be displayed on a display surface remains essentially unchanged.

For example, given a vibration between the projection device, e.g., a projector, and an associated display surface or projection surface, the viewer in this case no longer perceives the vibration on the projection surface as the result of a correspondingly compensated projection, since the vibration between the projector and projection surface, for example, is countered by correspondingly controlling the projector, so that the image to be displayed on the display surface remains essentially unchanged.

In an exemplary embodiment of the invention, the image adjustment method further encompasses controlling the pixels of a pixel panel acting as an image display device based on the changes in position-time state information in such a way that the display of an image to be displayed on the display surface remains essentially unchanged.

Using a pixel arrangement in the form of a pixel panel or pixel matrix makes it possible to forgo moving parts to a very great extent, so that the corresponding vibration or altered position-time state information can only be countered via a shifted control operation on the pixel matrix. As a result, a display of the image to be displayed on the display surface or projection surface remains essentially unchanged.

One exemplary embodiment of the invention provides a computer program adapted to be run on a processor to implement the method according to the invention.

One exemplary embodiment of the invention provides a computer-readable medium that stores the computer program according to the invention.

In an exemplary embodiment of the invention, an aircraft is provided with an image adjustment device according to the invention and/or an image projection device according to the invention.

It must be noted that the above features can also be combined. Combining the above features can also yield interacting effects and consequences that go beyond the individual result of the corresponding features, even if not expressly described in any detail.

These and other aspects of the invention will become evident with reference to the embodiments described below.

BRIEF DESCRIPTION OF THE DRAWINGS

Exemplary embodiments of the invention will now be described below, with reference to the following drawings.

DETAILED DESCRIPTION OF EXEMPLARY EMBODIMENTS

Figure 1:
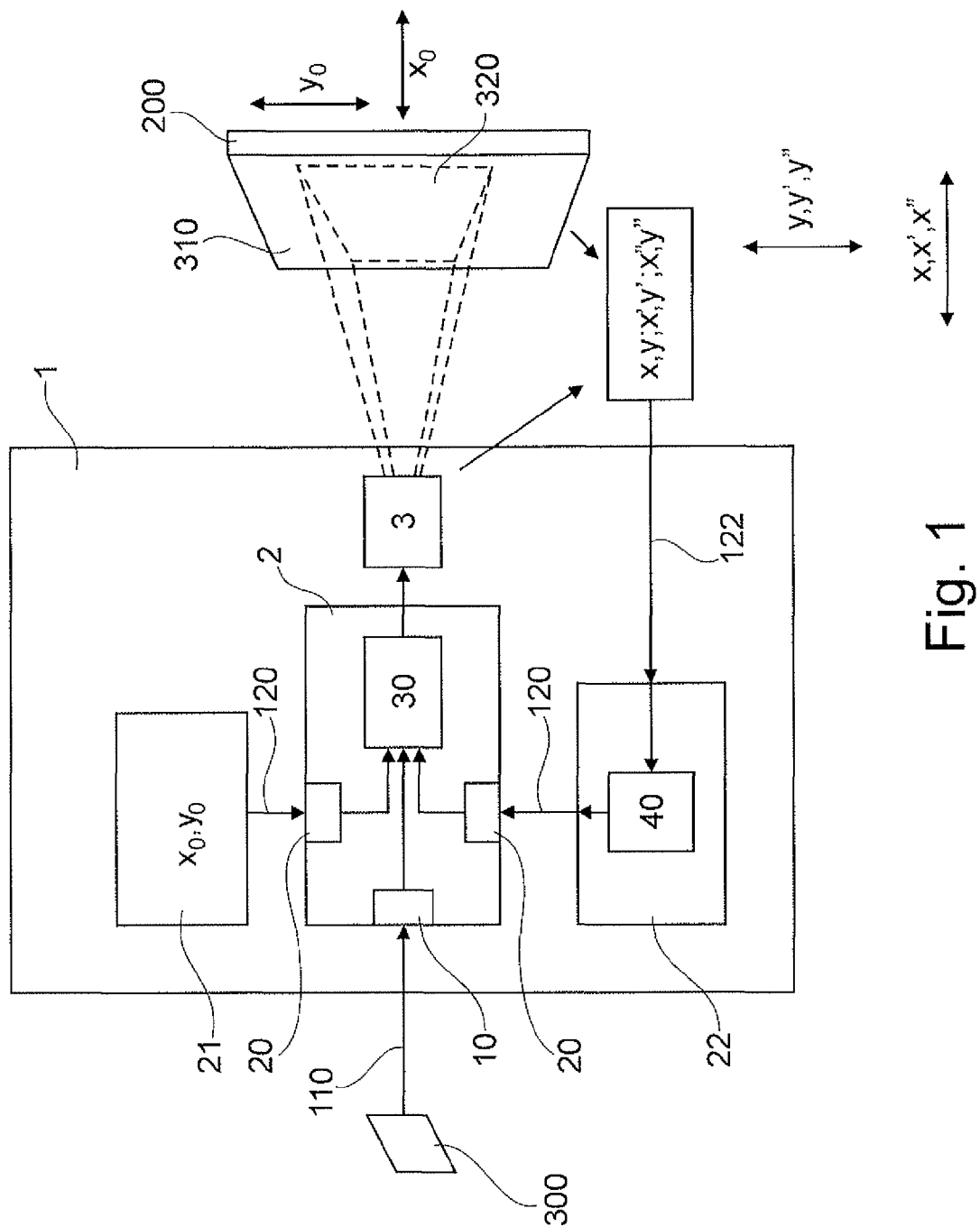
FIG. 1 shows a diagrammatic arrangement of an embodiment of the image adjustment device or image projection device according to the invention.

FIG. 1 shows a diagrammatic view of an exemplary embodiment of the invention. The image projection device 1 has an image adjustment device 2, an image projection or image display device 3, an input device 21 as well as a position-time state acquisition device 22. Let it be noted at this juncture that just an input device 21 or only a position-time state acquisition device can be provided, for example, so that an input device 21 and position-time state acquisition device 22 need not be provided at the same time. The input device 21 makes it possible to manually enter a desired position, in which the image 300 to be displayed is to be displayed on a display surface 200, for example. A desired position can here be an image alignment, but also an image distortion, which need not be limited solely to stretching with respect to height and width. Rather, a preliminary distortion can also be provided, for example, to enable an adjustment of the image 300 to be displayed to a curved projection surface 200.

The input device can here be adapted in such a way that corresponding image adjustment information 120 can be manually entered, for example via a keyboard.

The position-time state acquisition device 22 can here be adapted in such a way as to acquire position-time state information in the form of a position x, y, a movement x', y' or acceleration x", y". The type of state information used in a specific case depends on the kind of sensors used, in particular on whether the case involves a position sensor, a velocity sensor or an acceleration sensor. The corresponding position, velocity and acceleration data are here primarily recorded in directions involving the image plane of the image 300 to be displayed. Of course, a position, velocity or acceleration can take place in the direction lying perpendicular to the image plane, for example so that the focus and sharpness of an image to be projected can be adjusted and set.

The state information 122 acquired with sensors not depicted here is processed with an evaluation device 40, for example, in such a way that image adjustment information 120 based on position-time state information 122 can be provided at the second input 20. The image adjustment information 120 provided at the second inputs 20 by either the input device 21 and/or the position-time state acquisition device 22 can then be used as the basis for controlling an image display device 3 via a control device 30. The control device 30 is here provided with image information 110 for an image 300 to be displayed via a first input 10. The display device 3 then projects the image 300 to be displayed on the display surface 200 or projection surface. The display area 320 must here not fill the projection surface 200 completely, but a corresponding selection can be made with the input device 21 to adjust the projection in such a way as to optimally utilize the projection surface.

Figure 2:
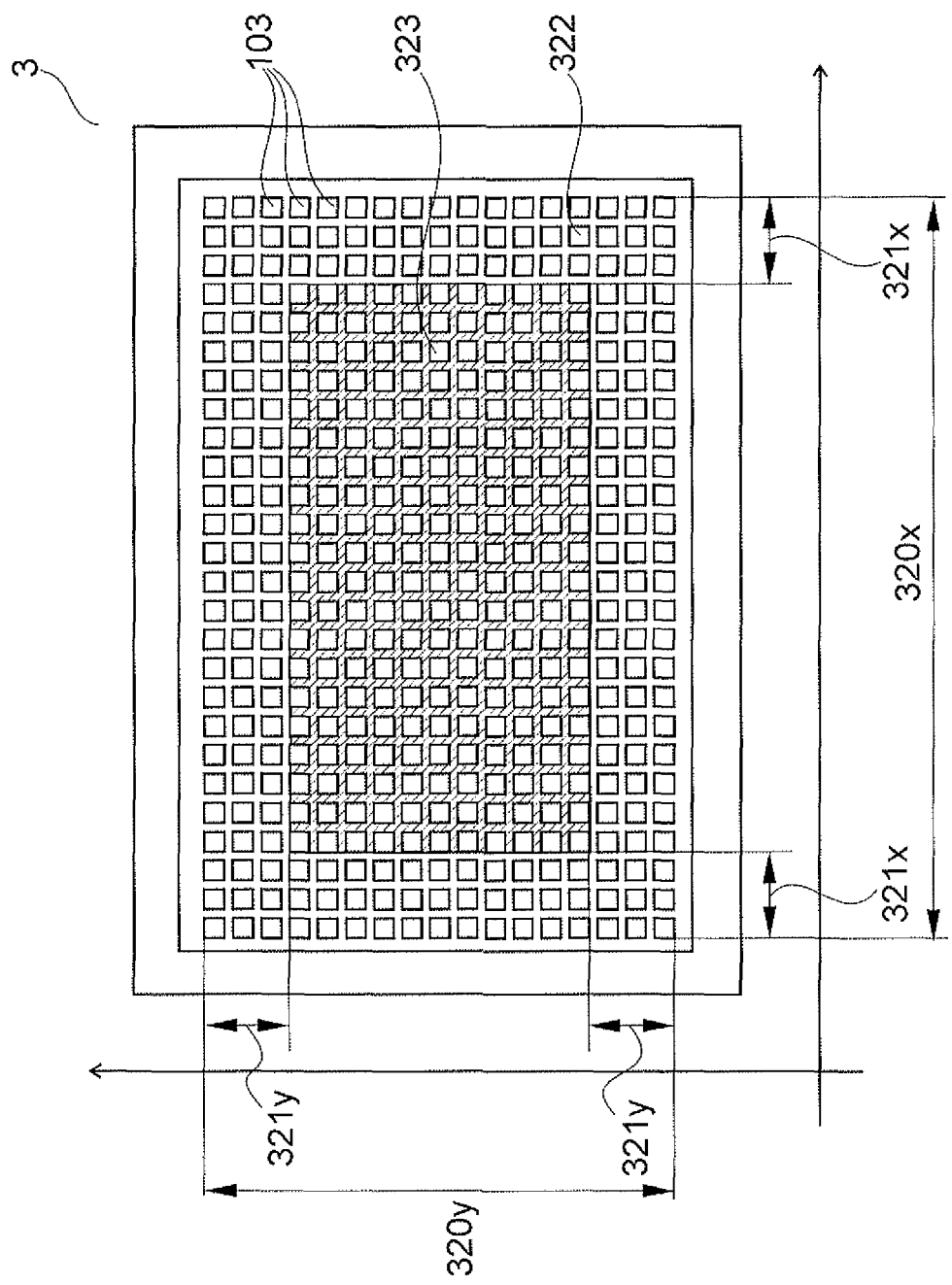
FIG. 2 shows an exemplary embodiment of a pixel panel.

For example, the display device 3 can be a projector with a pixel arrangement or pixel panel that exhibits a plurality of pixels 103, as shown on FIG. 2. The entire pixel surface 322 can here have a diminished area 323 used for projection purposes. Possibilities include pixel panels in the form of backlit pixel panels or reflection pixel panels, e.g., of the kind used in DLP technology.

Given the use of an only diminished area 323 for example, if the diminished area 323 vibrates, the diminished area 323 can be subjected to shifted control within the framework of the overall surface 322, so that a vibration can be countered accordingly. If the vibration is assumed to be acting exclusively in a vertical direction by an amplitude corresponding roughly to an excursion corresponding to one pixel, the pixels are each controlled, increased or decreased by one row at the same frequency at which the vibration appears, so that the vibration is countered by a corresponding offsetting effect, and the display of an image 300 to be displayed on a display surface 200 remains essentially unchanged. At a greater excursion, the chronological control is adjusted to the acquired course of vibration in terms of amplitude and frequency, so that at most an erroneous display measuring on the order of a half pixel spacing takes place given an optimal regulation or control.

The use of a diminished area 323 reduces the so-called native resolution of the overall area 322 with a width of 320$x$ or height of 320$y$ by the corresponding buffer areas 321$x$ in width and 321$y$ in height, wherein these buffer areas are available in a width of 321$x$ and 321$y$ for offsetting a vibration, for example. The width of the buffer areas 321$x$ and 321$y$ is best designed for the maximum expected vibration level.

The use of a pixel panel makes it possible to realize a projection device with essentially no larger moving parts, wherein a corresponding image stabilization is achieved by a reduced resolution in a diminished pixel area 323 relative to the overall area 322.

Figure 3:
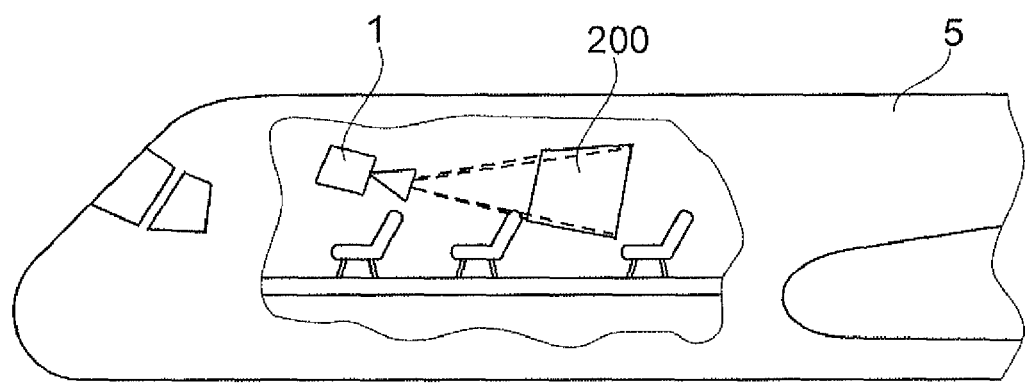
FIG. 3 shows an exemplary embodiment of an aircraft with an image projection device according to the invention.

FIG. 3 shows an exemplary embodiment of an aircraft with an image projection device 1 according to the invention and an associated projection surface 200. Let it be noted that several projection devices or image and film projection devices 1 according to the invention can also be provided in an aircraft, as well as in a ship or road vehicle (not shown).

Figure 4:
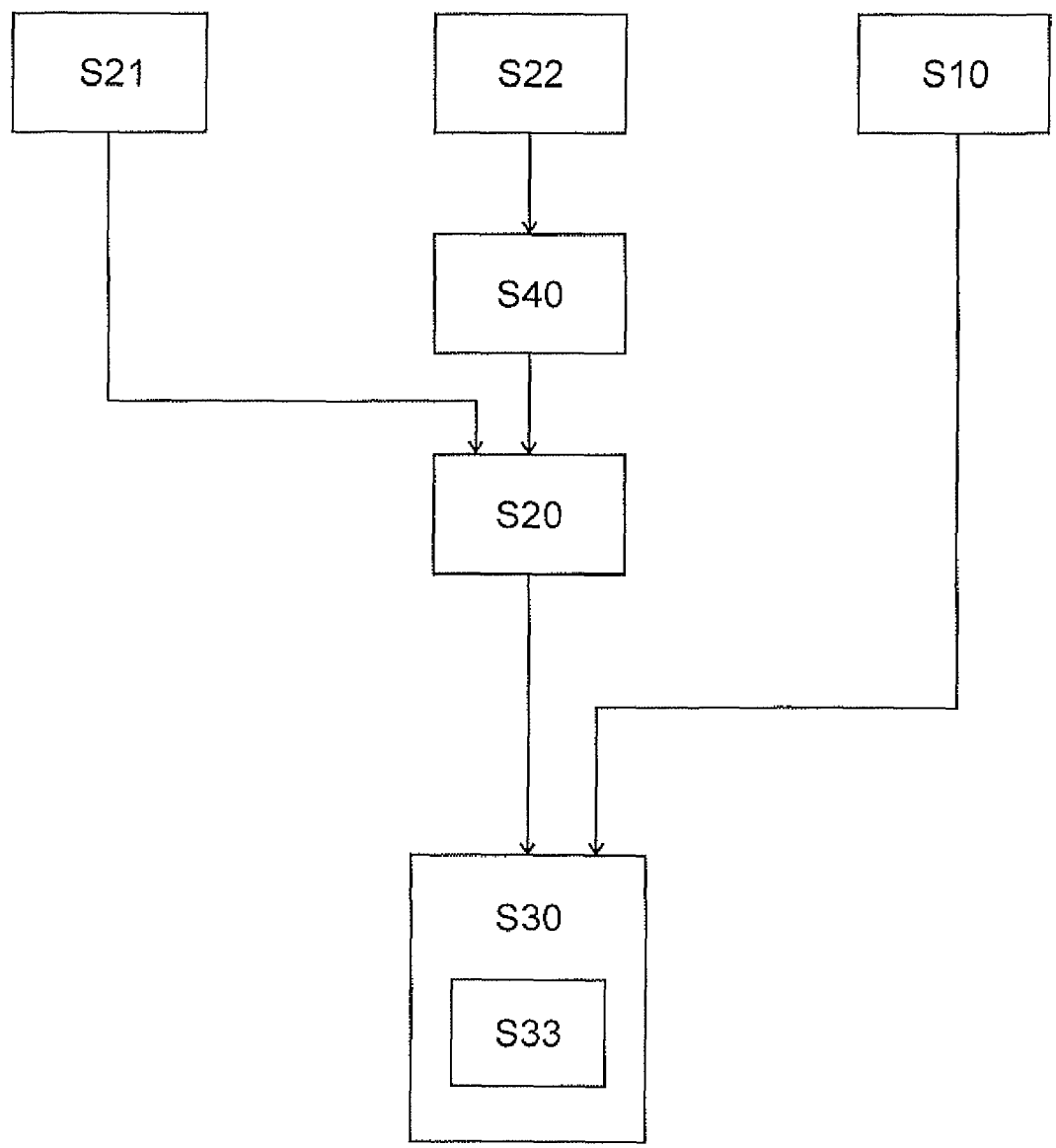
FIG. 4 shows an exemplary embodiment of a sequence diagram for the method according to the invention.

FIG. 4 shows a diagrammatic view of a procedural sequence according to an exemplary embodiment of the invention. For example, image information for an image 300 to be displayed is acquired in a step S10, so that this image to be displayed can be reproduced on a display surface 200. In step S20, image adjustment information is generally received and/or acquired. This image adjustment information can consist of the entry S21 of a desired position $x_0$, $y_0$ of the image 300 to be displayed, for example, which is used among other things to stipulate the position and size with which an image 300 to be displayed is to be shown on a display surface 200. Further, image adjustment information can also be provided in the form of position-time state information 122 in step S22. This position-time state information can be evaluated in step S40, for example, so that image adjustment information can be provided in step S20 based on the position-time state information. Based on the image adjustment information from step S20 and the image information acquired in step S10, an image display device can be controlled in step S30 in such a way as to adjust a desired image display using the image information and image adjustment information. As part of step S30, for example, pixels 103 of an image display device 3 can be controlled in step S33, for example pixels of a pixel panel. The pixel control described in conjunction with FIG. 2 makes it possible to adjust the image accordingly without larger, mechanically moving parts (of course, except for the structural design underlying DPL technology, for example), so that the image displayed on a display surface 300 remains essentially unchanged. It should be noted that the described steps need not be taken in this exact sequence, but rather can be performed in a modified sequence whenever possible or sensible.

It should be noted that both the device and/or devices as well as the methods along with the computer program and computer-readable medium can be used not just in aircraft, but also in other vehicles, in which an image must be correspondingly adjusted during image display, in particular projections. Of course, such a device or method can also be used in cases involving projection devices that are fixed, but still might be exposed to an elevated vibration influence.

In addition, let it be noted that "comprising" does not preclude other elements or steps, and that "a" or "an" does not preclude a plurality. Let it further be noted that features or steps described with reference to one of the above exemplary embodiments can also be used in combination with other features of steps in other exemplary embodiments described above. Reference numbers in the claims are not to be regarded as limiting.

The invention claimed is:

1. An image adjustment device for an image projection device for an aircraft, comprising:
 a control device for the image projection device, said control device comprising a first input and a second input;
 a position-time state acquisition device adapted to acquire position-time state information of an image display device of the image projection device relative to a display surface associated with the image projection device for displaying an image thereon; and
 an evaluation device adapted to evaluate the position-time state information and provide image adjustment information based on the evaluated position-time state information, said image adjustment information configured to maintain a display of an image on the display surface substantially unchanged despite a relative shift between the display surface and the image display device,
 wherein the first input is configured to receive image information for an image to be displayed on the display surface;
 wherein the second input is configured to receive the image adjustment information, and
 wherein the control device is adapted to control the image display device based on the image information present at the first input and the image adjustment information present at the second input.

2. The image adjustment device of claim 1, wherein the second input is adapted to acquire information about a desired position of an image to be displayed on the display surface.

3. The image adjustment device of claim 1, further comprising an input device in communication with the control device and adapted to manually input the image adjustment information.

4. The image adjustment device of claim 1, wherein the position-time state acquisition device is adapted to acquire information about at least one of a position, a movement and an acceleration of the image display device relative to the display surface.

5. The image adjustment device of claim 1, wherein the control device is adapted to control the image display device in such a way given a change in the position-time state information that a display area of an image to be displayed on the display surface remains essentially unchanged.

6. The image adjustment device of claim 1, wherein the control device is adapted in such a way that, given a change in the position-time state information, pixels of a pixel panel acting as the image display device can be controlled in such a way based on the change in the position-time state information that a display of an image to be displayed on the display surface remains essentially unchanged.

7. An image projection device for an aircraft, comprising:
 an image adjustment device comprising:
  a control device for the image projection device, said control device having a first input and a second input;
  a position-time state acquisition device adapted to acquire position-time state information of an image display device of the image projection device relative to a display surface associated with the image projection device for displaying an image; and
  an evaluation device adapted to evaluate the position-time state information and provide an image adjustment information based on the evaluated position-time state information, said image adjustment information configured to maintain a display of an image on the display substantially unchanged despite a relative shift between the display surface and the image projection device,
  wherein the first input is configured to receive image information for an image to be displayed on the display surface;
  wherein the second input is configured to receive the image adjustment information, and
  wherein the control device is adapted to control the image display device based on the image information present at the first input and the image adjustment information present at the second input, and
 the image display device.

8. The image projection device of claim 7, wherein the image display device comprises a pixel panel.

9. An image adjustment method for an image adjustment device, comprising the steps of:
 acquiring image information for an image to be displayed on a display surface;
 acquiring position-time state information of an image display device relative to the display surface for the image to be displayed;
 evaluating of the position-time state information;
 providing image adjustment information based on the evaluated position-time state information, the image adjustment information configured to maintain a display of an image on the display substantially unchanged despite a relative shift between the display surface and an image projection device; and
 controlling the image display device based on the image information and the image adjustment information to maintain a display of an image on the display substantially unchanged despite a relative shift between the display surface and the image projection device.

10. The image adjustment method of claim 9, wherein the image adjustment information comprises information about a desired position of an image to be displayed on the display surface.

11. The image adjustment method of claim 9, further comprising manually selecting the image adjustment information.

12. The image adjustment method of claim 9, wherein the position-time state information comprises information about at least one of a position, a movement and an acceleration of the image display device relative to the display surface.

13. The image adjustment method of claim 9, wherein the controlling step is performed in such a way that, given a change in the position-time state information, a display of an image to be displayed on the display surface remains essentially unchanged.

14. The image adjustment method of claim 9, further comprising controlling pixels of a pixel panel acting as an image display device in such a way based on the change in the position-time state information that a display of an image to be displayed on the display surface remains essentially unchanged.

15. A computer-readable medium that stores a computer program, configured, when executed by a processor, to implement a method, said method comprising the steps of:
  acquiring image information for an image to be displayed on a display surface;
  acquiring position-time state information of an image display device relative to the display surface for the image to be displayed;
  evaluating of the position-time state information;
  providing image adjustment information based on the evaluated position-time state information, the image adjustment information configured to maintain a display of an image on the display substantially unchanged despite a relative shift between the display surface and an image projection device; and
  controlling the image display device based on the image information and the image adjustment information to maintain a display of an image on the display substantially unchanged despite a relative shift between the display surface and the image projection device.

16. The image adjustment device of claim 1, wherein the image adjustment information is configured to achieve a predetermined image projection position on the display surface.

17. The image adjustment device of claim 1, wherein the image adjustment information is configured to achieve a predetermined image projection size on the projection surface.

18. The image adjustment device of claim 1, wherein the image adjustment information is configured to offset vibration influences on at least one of the display surface and the image display device.

* * * * *